(12) United States Patent
Kowalski et al.

(10) Patent No.: US 9,377,784 B2
(45) Date of Patent: Jun. 28, 2016

(54) ADAPTABLE AUTOMATIC NACELLE CONVERSION FOR TILT ROTOR AIRCRAFT

(71) Applicant: The Boeing Company, Chicago, IL (US)

(72) Inventors: Jacob Kowalski, Glen Mills, PA (US); Ivan Grill, Media, PA (US); Robert T. Seminole, Wayne, PA (US)

(73) Assignee: The Boeing Company, Chicago, IL (US)

( * ) Notice: Subject to any disclaimer, the term of this patent is extended or adjusted under 35 U.S.C. 154(b) by 122 days.

(21) Appl. No.: 14/341,582

(22) Filed: Jul. 25, 2014

(65) Prior Publication Data

US 2016/0026190 A1    Jan. 28, 2016

(51) Int. Cl.
  *G05D 1/08* (2006.01)
  *G01C 23/00* (2006.01)
  *G01P 5/18* (2006.01)
  *B64C 29/00* (2006.01)

(52) U.S. Cl.
  CPC .......... *G05D 1/0808* (2013.01); *B64C 29/0033* (2013.01); *G01C 23/005* (2013.01); *G01P 5/18* (2013.01)

(58) Field of Classification Search
  None
  See application file for complete search history.

(56) References Cited

U.S. PATENT DOCUMENTS

| | | | |
|---|---|---|---|
| 5,054,716 A | 10/1991 | Wilson | |
| 6,328,256 B1 | 12/2001 | Ryan et al. | |
| 6,644,588 B2 | 11/2003 | King et al. | |
| 7,571,879 B2* | 8/2009 | Builta | G05D 1/0858 244/194 |
| 7,693,620 B2 | 4/2010 | Dubeck et al. | |
| 2014/0339372 A1* | 11/2014 | Dekel | B64C 29/0033 244/7 R |
| 2015/0197335 A1* | 7/2015 | Dekel | B64C 29/0033 701/5 |

OTHER PUBLICATIONS

Walz et al., "Nacelle Control Augmentation for Tiltrotor Flight Directors", presented at American Helicopter Society 55th Annual Forum, Montreal, Canada, May 25-27, 1999.

* cited by examiner

*Primary Examiner* — Christopher P Ellis
*Assistant Examiner* — Richard G Davis
(74) *Attorney, Agent, or Firm* — Ostrager Chong Flaherty & Broitman P.C.

(57) ABSTRACT

Systems and methods for displaying to a tilt rotor aircraft pilot an optimum nacelle position and/or automatically controlling movement of the nacelles for the pilot. An automatic nacelle conversion function employs an active flight director speed mode to provide a current desired speed and a final speed. When the automatic nacelle conversion function is in a passive (uncoupled) mode of operation, the pilot follows visual cues, manually achieving the commanded nacelle position by rotating a thumbwheel. When in an active (coupled) mode of operation, the automatic nacelle conversion function provides a fully automatic nacelle controller requiring no pilot input. This automatic nacelle controller provides a variable nacelle rate along with several angle versus speed schedules tailored for different guidance speed modes and a wide range of aircraft configurations. The automatic nacelle conversion function is improved though the inclusion of altitude, rate of climb, and deceleration rate commands.

16 Claims, 8 Drawing Sheets

ADAPTABLE AUTOMATIC NACELLE CONVERSION FOR TILT ROTOR AIRCRAFT

STATEMENT REGARDING FEDERALLY SPONSORED RESEARCH OR DEVELOPMENT

This invention was made with Government support under contract number N00019-12-G0006 awarded by the Department of Defense. The Government has certain rights in this invention.

BACKGROUND

The present disclosure relates generally to aircraft control systems and, in particular, to a nacelle control system in a tilt rotor aircraft.

Tilt rotor aircraft are hybrids between traditional helicopters and traditional propeller-driven aircraft. Typical tilt rotor aircraft have rotor systems that are capable of articulating relative to the aircraft fuselage. The signature characteristic of the tilt rotor is a moveable nacelle which allows the pilot to vector thrust throughout the full range of operating speeds. Tilt rotor aircraft are capable of converting from a helicopter mode, in which the aircraft can take-off, hover, and land like a helicopter; to an airplane mode, in which the aircraft can fly forward like a fixed-wing airplane. The desired flight path is achieved through proper coordination of a thrust control lever, a longitudinal stick, a lateral stick, and nacelle position controls.

In the V-22 Osprey aircraft, tilt rotor technology combines vertical takeoff and landing performance of a helicopter with the speed and range of a turboprop airplane. The aircraft flight controls comprise a center stick that is used to control pitch and roll, foot pedals to control yaw, a thrust control lever to control thrust, and a thumbwheel to control nacelle position. The first three flight controls are common to conventional aircraft (with the thrust control lever representing a combination of rotorcraft collective and airplane throttle), but the thumbwheel that controls nacelle position is common only to tilt rotor aircraft. The thumbwheel provides control of the nacelles over a range of 0 to 97.5 degrees. The thumbwheel commands three aircraft configurations: airplane, helicopter, and an airplane/helicopter (hybrid) mode. Airplane mode is defined when nacelles are placed at 0 degrees, and helicopter mode is defined when nacelles are placed at greater than 80 degrees. Nacelle settings between 0 and 80 degrees are defined as conversion mode, which is a hybrid of the airplane and helicopter modes. During conversion to airplane mode, the cyclic and collective rotor controls phase out to permit control by conventional aircraft flaperons, rudders, and elevator. The rate at which the nacelles move is proportional to the pilot's thumbwheel displacement. Nacelle modulations may range from 0 deg/sec to a maximum rate of 8.0 deg/sec. Upper conversion corridor protection and lower conversion protection, which limit the nacelles' range of movement as a function of airspeed and altitude, are provided to reduce structural damage and the tendency to stall the aircraft in flight.

The main difference between a conventional turboprop aircraft and the V-22 aircraft is that the inputs from both the longitudinal and vertical axes control speed, altitude, or a mixed variation of speed and altitude depending upon the nacelle setting, as summarized below.

| AXIS VERSUS NACELLE SETTNGS | | |
|---|---|---|
| Axis Input | Nacelle Angle | Output |
| Longitudinal | 0 deg | Altitude |
| Longitudinal | 90 deg | Speed |
| Longitudinal | 45 deg | Speed/Altitude |
| Vertical | 0 deg | Speed |
| Vertical | 90 deg | Altitude |
| Vertical | 45 deg | Speed/Altitude |

Pilots must modulate the angle of the nacelles within a conversion corridor while making inputs to the longitudinal and vertical axes to achieve a desired speed and altitude.

Flight directors perform the basic task of translating flight guidance commands into a logical set of display symbology. The pilot responds to the display symbology and applies control system inputs to guide the aircraft along a desired flight path. During operation of a tilt rotor aircraft, nacelle control is required with all flight director speed modes, either coupled or uncoupled. Uncoupled operations require the pilot to follow flight director cues by manipulating the aircraft controls appropriately. During coupled operations, the flight control system automatically minimizes flight director guidance errors. The following flight director speed modes require nacelle control: Airspeed Select/Hold (SPD SELECT), Approach to Hover (AHOV), and Depart from Hover (DHOV/GA)

Aside from making inputs to each control axis, pilots are faced with other cockpit management tasks. Pilots are continuously scanning the operating conditions of the aircraft and monitoring system status. The V-22 cockpit contains multiple instrument displays that must be monitored on a regular basis during flight operations. Providing a nacelle position indicator that suggests to the pilot the optimum nacelle position for a given desired speed reduces pilot workload and increases safety of flight. Eliminating altogether the need to modulate nacelle angle manually (fifth axis) by providing an automated nacelle conversion function decreases workload further, improves safety of flight, improves handling qualities, and increases mission success rate.

The automatic nacelle conversion capability for tilt rotor aircraft can be improved through the use of additional guidance and atmospheric data.

SUMMARY

The subject matter disclosed herein is directed to improved systems and methods for displaying to a tilt rotor aircraft pilot an optimum nacelle position and/or automatically controlling movement of the nacelles for the pilot. The systems and methods disclosed in detail below comprise an improved automatic nacelle conversion for tilt rotor aircraft function, hereinafter referred to as the AUTO NAC function.

The AUTO NAC function employs an active flight director speed mode to provide a current desired speed and a final speed. This AUTO NAC function has two modes of operation: passive (uncoupled) and active (coupled). When the AUTO NAC function is in a passive mode, the pilot follows visual cues, manually achieving the commanded nacelle position by rotating the thumbwheel. When in an active mode, the AUTO NAC function provides a fully automatic nacelle controller requiring no pilot input. The AUTO NAC function provides a variable nacelle rate along with several angle-versus-speed schedules that have been tailored for different guidance speed modes and a wide range of aircraft configurations. An automatic rotor RPM command is provided to automatically command rotor RPM appropriate to the flight condition when nacelles transition on or off of the downstop.

The AUTO NAC function is improved though the inclusion of altitude, rate of climb, and deceleration rate commands. Use of this additional data provides improved stability of aircraft attitude and reduces trim requirements. This reduces pilot workload as well as enables safe crew and passenger movement as the aircraft reconfigures for landing.

One aspect of the subject matter disclosed in detail below is a method, performed by a computer system, for generating a nacelle angle command, comprising the following operations: converting a commanded groundspeed into a commanded airspeed by taking into account the pressure altitude of a tilt rotor aircraft and ambient air temperature (sensed or pre-stored) and inputting the commanded airspeed to a speed-versus-nacelle-angle schedule to obtain a nacelle angle that produces a favorable pitch attitude at a given airspeed in un-accelerated level flight of the tilt rotor aircraft. This method may further comprise the following operations: computing an inertial descent rate command for the tilt rotor aircraft; and computing an adjusted nacelle angle command as a function of the inertial descent rate command. Preferably, the adjustment is also a function of the deceleration rate command. The foregoing method may further comprise displaying the nacelle angle command on a cockpit display and/or controlling a conversion actuator in accordance with the adjusted nacelle angle command.

In accordance with one embodiment, the adjustment to the nacelle angle comprises: inputting the commanded airspeed to a speed versus descent gain schedule which outputs a descent gain; forming a first product by multiplying the descent gain and the inertial descent rate command; inputting the commanded airspeed to a speed versus deceleration gain schedule which outputs a deceleration gain; forming a second product by multiplying the deceleration gain and the deceleration rate command; summing the first and second products to form an adjustment angle; and summing the nacelle angle and the adjustment angle.

In accordance with another embodiment, the operation of converting a commanded groundspeed into a commanded airspeed comprises: computing a component of wind velocity along a flight path of the tilt rotor aircraft; filtering the component of wind velocity; summing the filtered component of wind velocity and the commanded groundspeed to form a commanded true airspeed; computing a commanded calibrated airspeed using the commanded true airspeed, the pressure altitude, and the associated ambient air temperature; and computing a commanded airspeed through a weighted average of the commanded true airspeed and the commanded calibrated airspeed using weighting factors which are a function of a nacelle angle.

In accordance with a further embodiment, the operation of computing an inertial descent rate command comprises: summing an inertial rate of climb and a rate of climb error to obtain a commanded inertial vertical velocity; filtering the commanded inertial vertical velocity; and limiting the filtered commanded inertial vertical velocity to a range.

Another aspect of the subject matter disclosed in detail below is a system for generating a nacelle angle command onboard a tilt rotor aircraft, comprising a computer system programmed to perform the following operations: converting a commanded groundspeed into a commanded airspeed by taking into account the pressure altitude of a tilt rotor aircraft and ambient air temperature (sensed or pre-stored); and inputting the commanded airspeed to a speed versus nacelle angle schedule to obtain a nacelle angle that produces a favorable pitch attitude at a given airspeed in un-accelerated level flight of the tilt rotor aircraft. The computer system may be further programmed to perform the following operations: computing an inertial descent rate command of the tilt rotor aircraft; and computing an adjusted nacelle angle command as a function of the inertial descent rate command. Preferably, the adjustment is also a function of a deceleration rate command.

In accordance with one embodiment, the system further comprises a cockpit display for the pilot, wherein the computer system is further programmed to display the nacelle angle command on the cockpit display. In accordance with another embodiment, the system further comprises a conversion actuator and a tiltable nacelle, wherein the computer system is further programmed to control the conversion actuator to tilt the nacelle in accordance with the nacelle angle command. Preferably, the computer system is programmed to display the nacelle angle command on the cockpit display and control the conversion actuator in accordance with the adjusted nacelle angle command.

A further aspect is a tilt rotor aircraft comprising: a fuselage; at least one wing member coupled to the fuselage; a tilt rotor assembly pivotally coupled to the at least one wing member for tilting over a range of nacelle angles; a nacelle conversion actuator for actuating the pivoting of the tilt rotor assembly; and a computer system programmed to perform the following operations: converting a commanded groundspeed into a commanded airspeed by taking into account a pressure altitude of the tilt rotor aircraft and ambient air temperature (sensed or pre-stored); inputting the commanded airspeed to a speed versus nacelle angle schedule to obtain a nacelle angle that produces a favorable pitch attitude at a given airspeed in un-accelerated level flight of the tilt rotor aircraft; computing the inertial descent rate command of the tilt rotor aircraft; computing an adjusted nacelle angle command as a function of the inertial descent rate command and the deceleration rate command; and controlling the conversion actuator to tilt the tilt rotor assembly in accordance with the adjusted nacelle angle command.

Other aspects of systems and methods for automatically controlling nacelle movement during operation of a tilt rotor aircraft are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Figure 1:
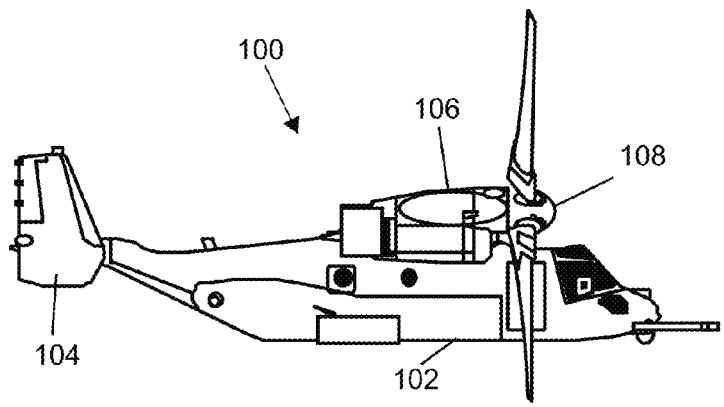
FIG. 1 is a diagram representing a side view of a tilt rotor aircraft having a multi-mode tilt rotor nacelle control system.

Referring to FIG. 1, a tilt rotor aircraft 100 having a multi-mode tilt-rotor nacelle control system is illustrated. The tilt rotor aircraft 100 comprises the following airframe components: a fuselage 102, a tail section 104 coupled to the aft portion of fuselage 102, left and right wing members (not visible in FIG. 1) coupled to fuselage 102, respective engine nacelles 106 (only one of which is visible in FIG. 1) pivotably coupled to the left and right wing members, a respective engine and prop-rotor gear box (not shown) housed inside each engine nacelle 106, and respective prop-rotors 108 (only one of which is visible in FIG. 1) coupled to the respective engine by means of the respective prop-rotor gear boxes. The combination of each engine nacelle, engine, prop-rotor gear box, prop-rotor, and other power transmission components operably associated with nacelles 106 are also referred to herein as the "tilt rotor assembly". The tilt rotor aircraft 100 can operate in either an airplane mode, in which it flies like a fixed-wing aircraft, or in a helicopter mode, in which it can take off, fly, land, and hover like a helicopter or other rotary-wing aircraft. In FIG. 1, tilt rotor aircraft 100 is shown in the airplane mode.

The signature characteristic of the tilt rotor is a moveable nacelle which allows the pilot to vector thrust throughout the full range of operating speeds. The appropriate nacelle position is a function of airspeed and is normally controlled by the pilot via the flight control system. The desired flight path is achieved through proper coordination of a thrust control lever, a longitudinal stick, a lateral stick, and nacelle position controls. During conversion to airplane mode, the cyclic and collective rotor controls phase out to permit control by conventional aircraft flaperons, rudders, and elevator.

Conversion actuators for rotating the nacelles are not shown in FIG. 1, but such conversion actuators are well known and in use. For example, the operational tilt-rotor design for the V-22 aircraft achieves conversion (i.e., tilting) of the nacelle through the use of a linear actuator on a three-bar mechanism. These conversion actuators generally comprise first and second hydraulic motors that act on a common axis. A third hydraulic motor provides for triple redundancy. In this arrangement, a failure of the first motor will not stop the mechanism from functioning.

Figure 2:
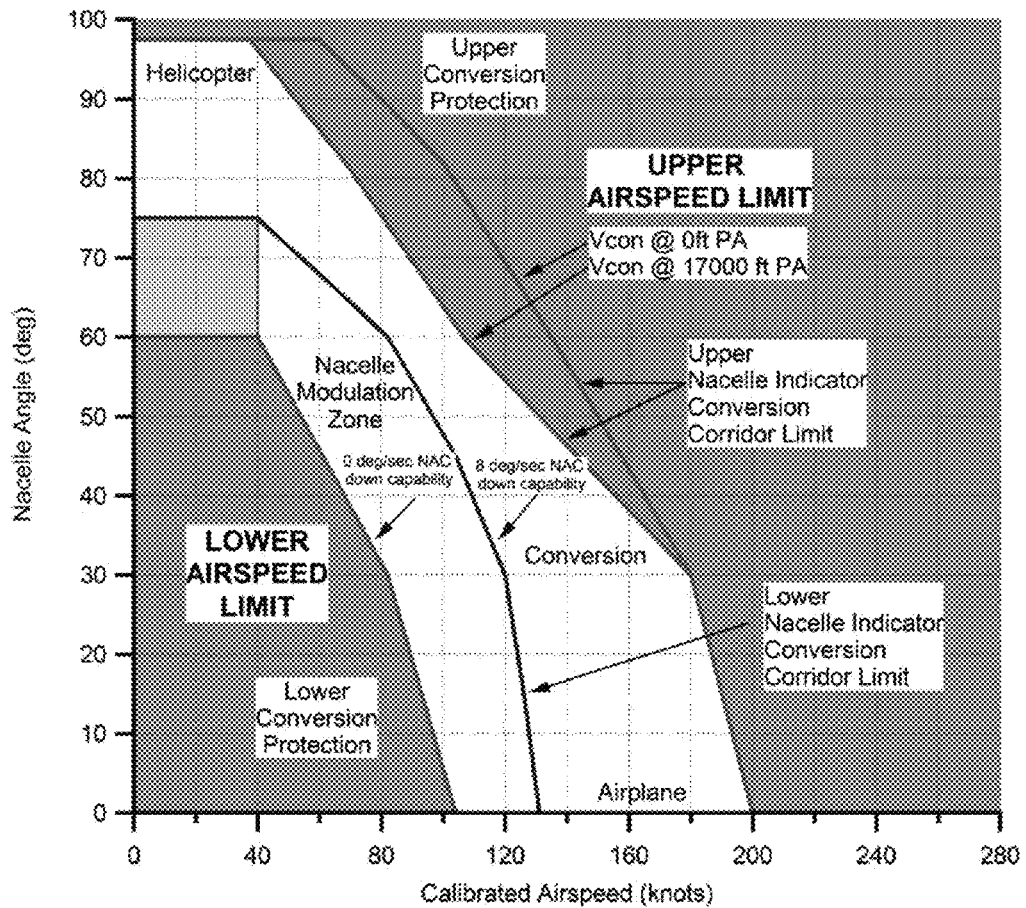
FIG. 2 is a graph showing nacelle angle (in degrees) versus calibrated airspeed (in knots) for a tilt rotor aircraft having a nacelle control system with upper conversion corridor protection and lower conversion protection.

Upper conversion corridor protection and lower conversion protection, which limit the nacelles' range of movement as a function of airspeed and altitude, are provided to reduce structural damage and the tendency to stall the aircraft in flight. FIG. 2 is a graph showing nacelle angle (in degrees) versus calibrated airspeed (in knots) for a tilt rotor aircraft having a nacelle control system with upper conversion corridor protection and lower conversion protection. An operational conversion corridor (indicated by the unshaded region bounded by the upper and lower nacelle indicator conversion corridor limits in FIG. 2) represents the safe operating envelope in which the tilt rotor aircraft may be operated. The operational conversion corridor is defined and predetermined in the structural design criteria of the aircraft. The nacelle control system protects the pilot from operating the tilt rotor aircraft outside of the operational conversion corridor.

Control is achieved through the nacelle thumbwheel located on the thrust control lever. Forward or aft displacement of the thumbwheel from center commands the nacelles to rotate at a rate proportional to the displacement up to a maximum of 8 deg/sec. The thumbwheel is used to transition between helicopter, conversion, and airplane mode. It is also used extensively in helicopter mode to control pitch attitude and speed.

Figure 3:
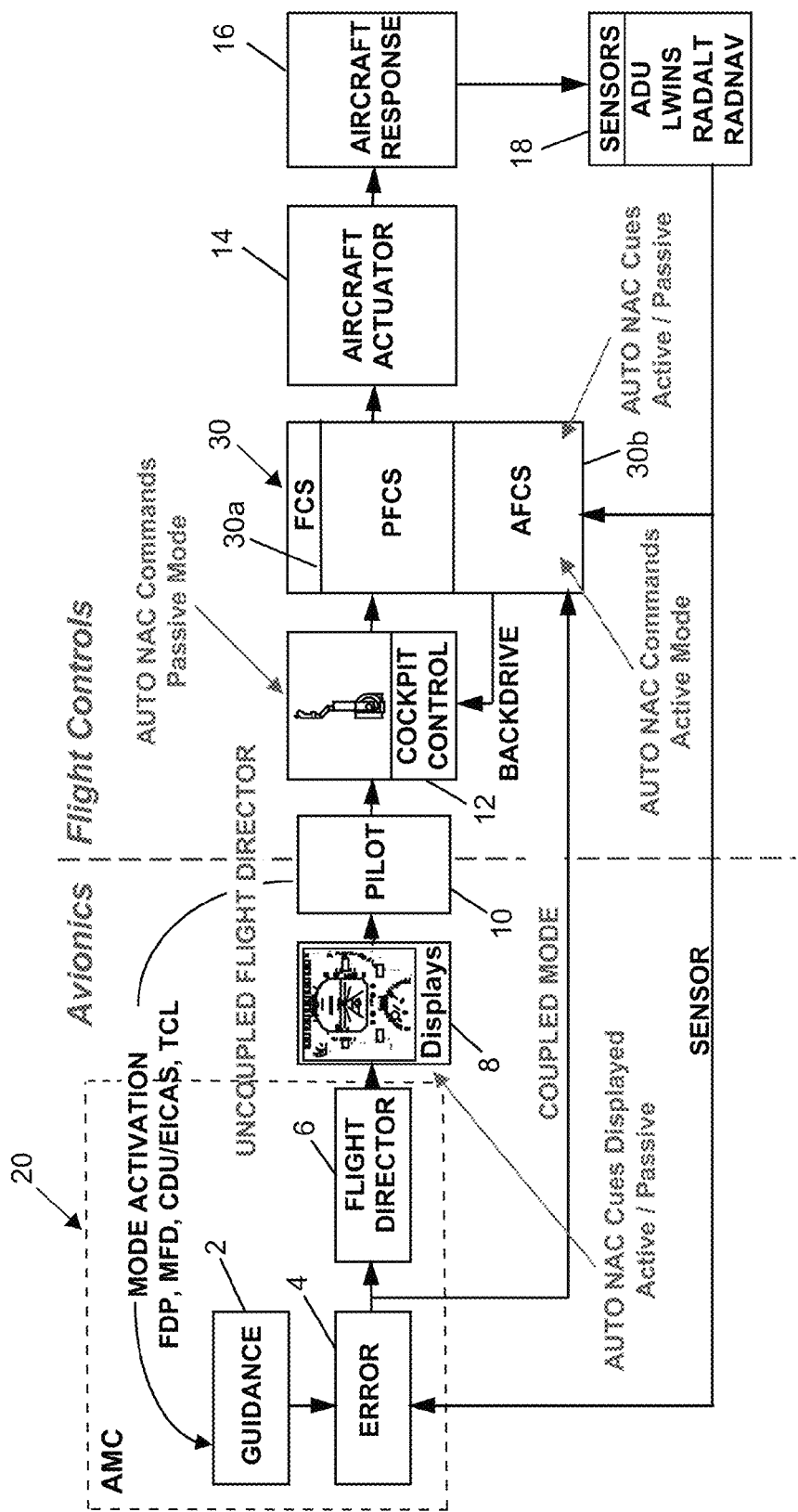
FIG. 3 is a block diagram showing a simplified version of a guidance and flight director control system architecture for a tilt rotor aircraft.

FIG. 3 is a block diagram showing a simplified version of guidance and flight director control system architecture for a tilt rotor aircraft. This system comprises an avionics mission computer (AMC) 20 and a flight control system (FCS) 30 comprising multiple flight control computers, each flight control computer comprising a first processor programmed to serve as a primary flight control system (PFCS) 30a and a second processor programmed to serve as an automatic flight control system (AFCS) 30b. The AMC 20 incorporates a flight director subsystem 6 which has three primary crew interfaces. A flight director panel (FDP) (not shown in FIG. 3) provides control and display for the flight director functions. The second primary interface is four multi-functional displays (MFD). One of their many functions is to provide flight director commands and mode status annunciators. The third interface is the control display unit/engine instrument and crew alerting system (CDU/EICAS), which is a center console display and keypad used for sub-mode selection and setup. The MFD and CDU/EICAS are represented by displays 8 in FIG. 3.

Still referring to FIG. 3, the flight director subsystem 6 provides cues to the displays 8 which are viewed by the pilot 10. More specifically, flight director symbology is displayed on the MFD. These cues reduce pilot workload by decreasing the number of data sources the pilot 10 must integrate to fly the aircraft using the cockpit controls 12. The system provides the operator a steering cue, speed cue, climb cue, and a nacelle cue based on calculations made by the AMC 20 and the FCS 30. The FCS 30 controls the aircraft actuators 14 (for example, the conversion actuators) to produce a desired aircraft response 16. The state of the aircraft is monitored by various sensors 18 which provide sensor feedback to the AMC 20 and the FCS 30. Sensors 18 may include an air data unit (ADU), a lightweight inertial navigation system (LWINS), a radar altimeter (RADALT), and a radio navigation system (RADNAV).

The flight director panel (not shown in FIG. 3) serves as the primary operator data entry interface for flight director system control and annunciation. The flight director system includes a number of separate modes that facilitate manual flight path and speed control for various phases of the mission. The pilot 10 has the ability to fly the modes coupled or uncoupled. Flight director modes are flown coupled by depressing the coupler button on the flight director panel. Pilots have the option to fly any speed mode, uncoupled or coupled, with the aid of an automatic nacelle conversion for tilt rotor aircraft function (hereinafter "AUTO NAC function") in either its passive or active modes. The flight director function provides commands to the AFCS 30b for automatic flight path and speed control when coupled. During uncoupled operation, the pilot is responsible for interpreting the flight director cues and making the cockpit control inputs needed to satisfy them.

The AUTO NAC function requires an active flight director speed mode to provide the current desired speed and the final desired, or reference, speed. AUTO NAC has two modes of operation: passive (uncoupled) and active (coupled). While in either mode, AUTO NAC provides visual cueing to the pilot that displays the optimum current and final nacelle positions that correspond to the current desired and final airspeeds. When AUTO NAC is in passive mode, the pilot follows the visual cues, manually achieving the optimized nacelle position by rotating the thumbwheel such that the actual nacelle position matches the desired. When in its active mode, AUTO NAC provides a fully automatic nacelle controller requiring no manual inputs from the pilot other than its activation. In active mode, the visual cueing provides the pilot with visibility of the system performance for purposes of cross checking. The AUTO NAC function provides a variable nacelle rate along with several nacelle angle versus speed schedules that have been optimized for different guidance speed modes and a wide range of aircraft configurations.

The pilot 10 selects reference values and mode engagements using the flight director panel. Guidance algorithms 2 and flight director algorithms 6 reside in the AMC 20. The guidance algorithms 2 compute longitudinal, lateral, and vertical command profiles based on pilot settings and planned flight scenarios. Error computations 4 by the AMC 20 determine the difference between the guidance commands and the sensed aircraft state. The results of the error computations 4 are sent to the flight director algorithms 6, which generate steering commands displayed on an MFD (included in displays 8 in FIG. 3). The flight director symbology directs the pilot where to position longitudinal stick, lateral stick, and the thrust control lever. For uncoupled flight director operation, if the pilot responds with the appropriate flight control inputs to satisfy the flight director steering commands the aircraft will converge on the reference values selected. For coupled operation, the pilot selects coupled mode on the FDP and the coupled mode errors are also sent to the flight control system. The coupled mode control law algorithms in the FCS 30 provide limited authority commands to null the errors and converge on the selected reference values. In a high frequency sense, the commands are sent directly to the appropriate rotor and control surfaces. In a low frequency sense, the commands are used to backdrive the cockpit controls 12 in the appropriate axis. In addition, the coupler includes the AUTO NAC function to automatically position the nacelles within the conversion corridor. Although no pilot input is required during coupled mode operation, the flight director commands are still displayed to allow the pilot to monitor the coupler.

The AUTO NAC passive mode functions any time a flight director speed mode is engaged. In passive mode, the pilot manually commands nacelle position in response to visual cues which provide the current desired and final nacelle positions as a function of the current desired and final speeds provided by the active flight director speed mode. The current desired nacelle position and final reference nacelle position indicators are superimposed upon the nacelle angle display in both the passive and active states of the AUTO NAC function. Nacelle position is controlled using the thumbwheel located on the thrust control lever.

The pilot 10 may engage the active mode of AUTO NAC through depression of the AUTO NAC button of the flight display panel. The "AUTO" annunciator then appears just below the nacelle position indicator to signal to the pilot 10 that active mode has been successfully engaged. During active operations, the AUTO NAC function, operating as a component of the AFCS 30*b*, satisfies the desired and final nacelle position indicators. The AFCS 30*b* generates the AUTO NAC commands that are both displayed to the pilot 10 as the visual cues and sent to the PFCS 30*a* for output to the conversion actuators to rotate the nacelles.

During the transition from helicopter mode to airplane mode, there is a fundamental change in the pilot's control strategy to maintain the desired flight path angle and speed. In helicopter and low-speed conversion modes of flight, the thrust control lever is used primarily to control aircraft vertical velocity and is very similar to collective control in a conventional helicopter. To change speed, the nacelle control is used together with longitudinal stick inputs to set the desired aircraft acceleration while maintaining a relatively level deck attitude. As the aircraft accelerates through high-speed conversion mode to airplane mode, the pilot uses a control strategy that progressively resembles that of a conventional fixed wing aircraft. Namely, thrust control lever input (i.e., power) is used to set the aircraft energy state while the longitudinal stick is used to manage this energy state by increasing or decreasing the flight path angle at relatively constant speed or allowing the aircraft to accelerate/decelerate.

The AUTO NAC function uses desired speed information from the guidance algorithms 2 to define the current desired nacelle position; the AUTO NAC schedule, which defines nacelle position as a function of airspeed, is optimized to reduce aircraft pitch response and minimize speed error. The final desired speed, or reference speed, is defined by the pilot before the flight director speed mode is activated.

The guidance algorithms 2 in the AMC 20 control moding, or changes in the state, of FCS functions such as the longitudinal axis coupler, vertical axis coupler, and AUTO NAC; the AMC 20 also generates signals such as speed error, altitude error, rate of climb error, and desired speed, to drive the FCS functions. Moding of the FCS functions generally involves 1) the FCS 30 providing an "available" bit to the AMC 20 to indicate that a given function is available for activation, 2) the AMC 20 sending an "accept" bit to the FCS 30, to activate the function, and 3) the FCS 30 returning an "engaged" bit, to communicate that the function has been successfully activated. This logical communication between the AMC 20 and FCS 30 is referred to as a "handshake". It is done to ensure that computers are ready and communicating properly. The handshake also provides a mechanism for disengaging the mode by either computer or pilot intervention. A simplified AMC-FCS interface is shown in FIG. 6.

There are two modes associated with the AUTO NAC function: passive mode and active mode. Within the design documentation, passive mode is referred to as autonacelle angle mode, and active mode is referred to as autonacelle control mode. As with other FCS functions, handshaking is required for the control of the autonacelle angle mode and autonacelle control mode. The autonacelle angle mode provides AUTO NAC cues for display to the pilot, and the autonacelle control mode provides the capability to automatically drive the nacelles.

Autonacelle angle, or passive, mode is activated whenever a speed guidance mode is active. When autonacelle angle mode is active, the Autonacelle Angle Accept discrete (see FIG. 6) is turned on. This output from the AMC 20 directs the FCS 30 to determine the current and final AUTO NAC tilt angles based upon the desired speed and desired final speed generated by the active speed guidance solution. The FCS 30 desired nacelle position and final nacelle position are transmitted back to the AMC 20 for display to the pilot.

Figure 6:
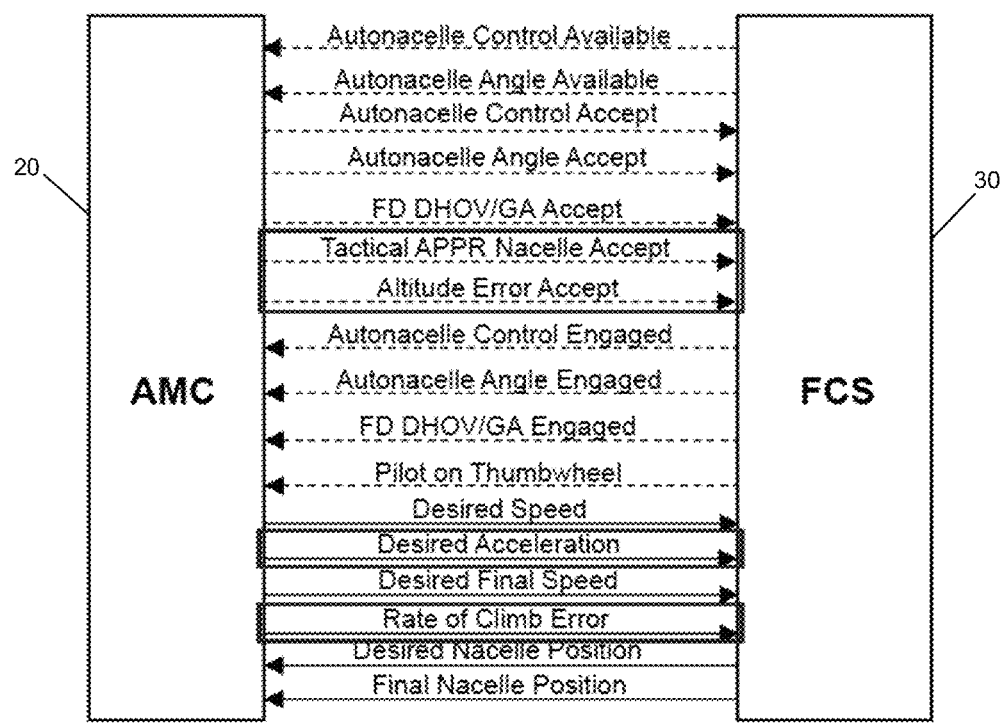
FIG. 6 is a block diagram showing an avionics mission computer to flight control system interface in accordance with one embodiment.

Still referring to FIG. 6, the FCS autonacelle angle availability discrete is provided to the AMC 20 by the FCS 30. It reflects the ability of the FCS 30 to accurately determine the AUTO NAC angles. It is used by the AMC 20 to determine if a speed guidance mode may be activated. The FCS Autonacelle Angle Engaged discrete provides an indication that the FCS has received the Autonacelle Angle Accept discrete and engaged the autonacelle angle mode.

When autonacelle control mode is activated, the Autonacelle Control Accept discrete is turned on. This output from the AMC 20 directs the FCS 30 to automatically command the nacelles to the AUTO NAC tilt angle determined by the autonacelle angle mode. The FCS Autonacelle Control Availability indicates if the FCS 30 is able to automatically control the position of the nacelles. The FCS Autonacelle Control Engaged discrete provides an indication that the FCS 30 has received the Autonacelle Control Accept discrete and engaged the autonacelle control mode.

Referring back to FIG. 3, within the AFCS 30*b* an automatic tilt schedule module computes the autonacelle tilt angle, autonacelle final tilt angle, and the autonacelle rate command. The autonacelle tilt angle and final tilt angle are sent to the AMC 20, as the desired nacelle angle and desired final nacelle angle, when the Autonacelle Angle Engaged discrete is set. The autonacelle rate command is provided to the PFCS 30*a* when the autonacelle control mode is engaged. Desired speed and final desired speed from the AMC 20 are input to schedules that yield the autonacelle tilt angle and autonacelle final tilt angle. The autonacelle tilt angle schedules are optimized for aircraft accelerations, decelerations, gross weight, and CG envelopes during guidance speed modes. In the event DHOV/GA is activated, as indicated in FIG. 6 by the FD DHOV/GA Accept bit from the AMC 20 being set, the autonacelle schedule will shift to use the DHOV/GA specialized autonacelle schedule. The specialized schedule is geared for a large climb rate and maximum acceleration out to the associated final desired speed. All the autonacelle tilt angle schedules are designed to maintain a comfortable pitch attitude and to prevent stall or high aerodynamic loads while providing an optimized acceleration or deceleration of the aircraft for various gross weight or CG. The autonacelle schedules are created utilizing data from simulations. Which schedule is employed to determine autonacelle tilt angle depends upon whether the aircraft is to accelerate or decelerate, as indicated by the comparison of desired speed to desired final speed.

Figure 4:
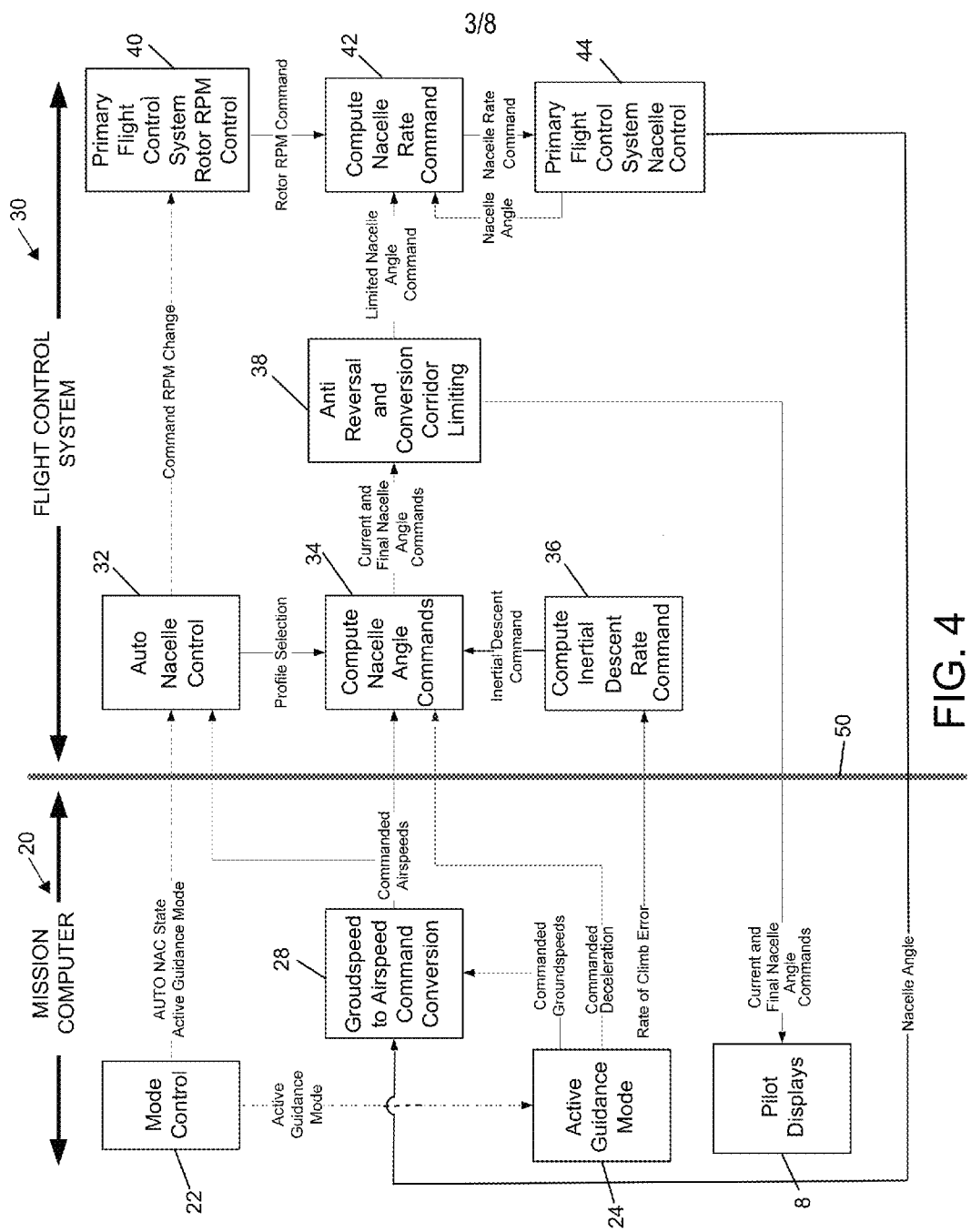
FIG. 4 is a functional flow diagram showing an adaptable automatic nacelle conversion for tilt rotor aircraft function in accordance with one embodiment.

FIG. 4 is a functional flow diagram showing an adaptable AUTO NAC function in accordance with one embodiment. The AUTO NAC function spans both the AMC 20 and the FCS 30. The interface 50 between the AMC 20 and the FCS 30 is indicated by the bold vertical line in FIG. 4. (This is a functional flow diagram and does not cleanly match software module boundaries.)

The mode control function 22 in the AMC 20 contains the pilot interface to activate and deactivate guidance/autopilot modes and manage combinations of/failures of those modes. The mode control function 22 outputs signals indicating which guidance mode is active and it outputs the AUTO NAC state to an auto nacelle control function 32 in the automatic flight control system.

Once selected by the pilot, the active guidance mode 24 computes a flight path/profile in accordance with parameters selected by the pilot. As previously noted, guidance algorithms compute longitudinal, lateral, and vertical command profiles based on pilot settings and planned flight scenarios. In particular, the active guidance mode 24 outputs current and final commanded groundspeeds to the groundspeed to airspeed command conversion function 28 in the AMC 20, commanded deceleration to a nacelle angle command computation 34 in the automatic flight control system, and rate of climb error to an inertial descent rate command computation 36 in the automatic flight control system. In accordance with an alternative embodiment, the inertial descent rate command could be computed by the active guidance mode 24 and then sent to the flight control system 30.

The groundspeed to airspeed command conversion function 28 in the AMC 20 also receives other parameter values, including the nacelle angle from a nacelle control function 44 in the primary flight control system. The groundspeed to airspeed command conversion function 28 takes in the current and final commanded groundspeeds and other parameters (as described in more detail below with reference to FIG. 5A) and outputs the current commanded airspeed and final airspeed to the auto nacelle control function 32 and nacelle angle command computation 34 in the automatic flight control system.

Figure 7:
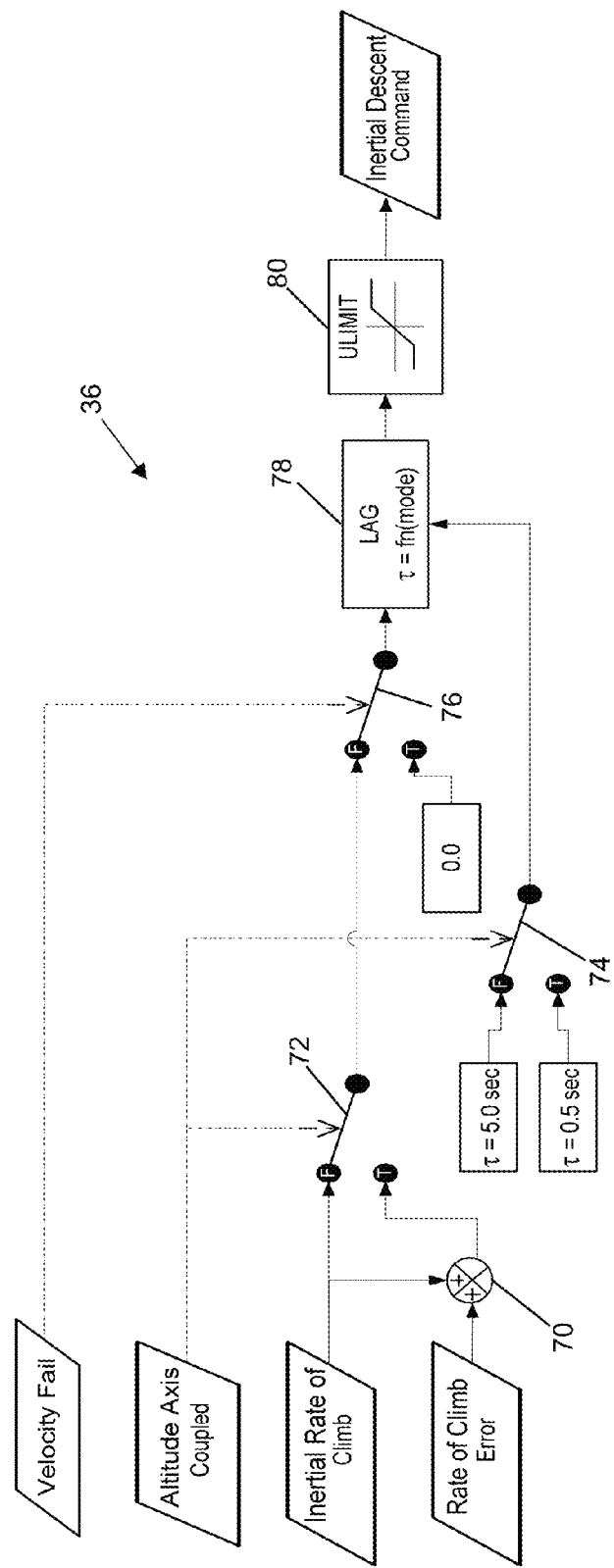
FIG. 7 is a flowchart showing control logic for computing an inertial descent rate command in accordance with one embodiment.

The rate of climb error is provided to the automatic flight control system and can be used by the inertial descent rate command computation 36 to infer the inertial descent rate commanded by the active guidance mode 24 (as described in more detail below with reference to FIG. 7). An inertial descent command is sent from the inertial descent rate command computation 36 to the nacelle angle command computation 34.

Still referring to FIG. 4, the auto nacelle control function 32 receives engagement/disengagement commands and failure states of the system from the mode control function 22 to determine the status of the automatic nacelle control and when to adjust the rotor RPM of the system. The auto nacelle function 32 sends a profile selection signal which dictates which auto nacelle schedules are selected by the nacelle angle command computation 34.

The auto nacelle function 32 also sends a change RPM command to a rotor RPM control function 40 in the primary flight control system of the FCS 30. The rotor RPM control function 40 tailors rotor RPM to the flight regime. In order for the AUTO NAC function to transition between flight regimes, it must first prompt rotor RPM changes. The rotor RPM command is sent to the nacelle rate command computation 42 to inhibit the nacelle rate command if rotor RPM is not appropriate for the flight condition.

Current and final commanded airspeeds from the AMC 20 are input to the nacelle angle command computation 34, which yields the autonacelle tilt angle and autonacelle final tilt angle. The nacelle angle command computation 34 computes current and final nacelle angle commands (as described in more detail below with reference to FIG. 8), which are output to an anti-reversal and conversion corridor limiting function 38 in the automatic flight control system. The current and final nacelle angle commands are sent from the anti-reversal and conversion corridor limiting function 38 to the cockpit displays 8, which include a nacelle angle indicator. Symbology representing the desired current and final nacelle angles is then displayed on the nacelle angle indicator.

The anti-reversal and conversion corridor limiting function 38 limits the autonacelle tilt angle such that the autonacelle tilt angle does not demonstrate a reversal, i.e., movement in the direction opposite the final tilt angle. The nacelle angle position currently being commanded by the primary flight control system is applied as a lower limit when the aircraft is decelerating and as an upper limit when it is accelerating; when the nacelle tilt angle command is already past the autonacelle final tilt angle, the final tilt angle is used as the limit instead. The latter case results in an autonacelle tilt angle that is equal to the final tilt angle.

To prevent autonacelle control disengagement due to the nacelles being outside the conversion corridor (see FIG. 2.0), autonacelle tilt angle is also limited to the upper conversion corridor minus a buffer and to the lower conversion corridor plus a buffer. The buffers provide margin from the corridors to allow for reaction to sudden movement of the conversion corridor in turbulence. Reaction to movement in the conversion corridor is the one case where a reversal in autonacelle tilt angle is permitted.

The limited nacelle angle commands are sent to the nacelle rate command computation 42. The nacelle rate command function 42 also receives the nacelle angle from the nacelle control function 44 in the primary flight control system. The nacelle rate command computation 42 computes the autonacelle rate command. The autonacelle rate command is provided to the nacelle control function 44 in the primary flight control system when the autonacelle control mode is engaged. Nacelle rates can be commanded though several means. The nacelle rate command computation 42 combines the inputs and applies limits. Rates can come manually from the pilot, or automatically though the AUTO NAC function as well as through structural load limiting or control power preservation functions. Additionally, different limits on the rate can be applied as functions of air/ground state and other factors. The nacelle control function 44 of the primary flight control system integrates rates to get nacelle angle command, and uses the hydraulic actuators to move the physical nacelles to the commanded position as well as maintain that position.

The system depicted in FIG. 4 comprises enhanced features having the following functionality: (1) a groundspeed to airspeed command conversion function 28; (2) an inertial descent rate command computation 36; and (3) a nacelle angle command computation 34 using auto nacelle schedules. These enhanced features and the associated changes to the AMC-FCS interface (highlighted by bold rectangles in FIG. 6) are described in detail below.

Groundspeed to Airspeed Command Conversion

Figure 5A:
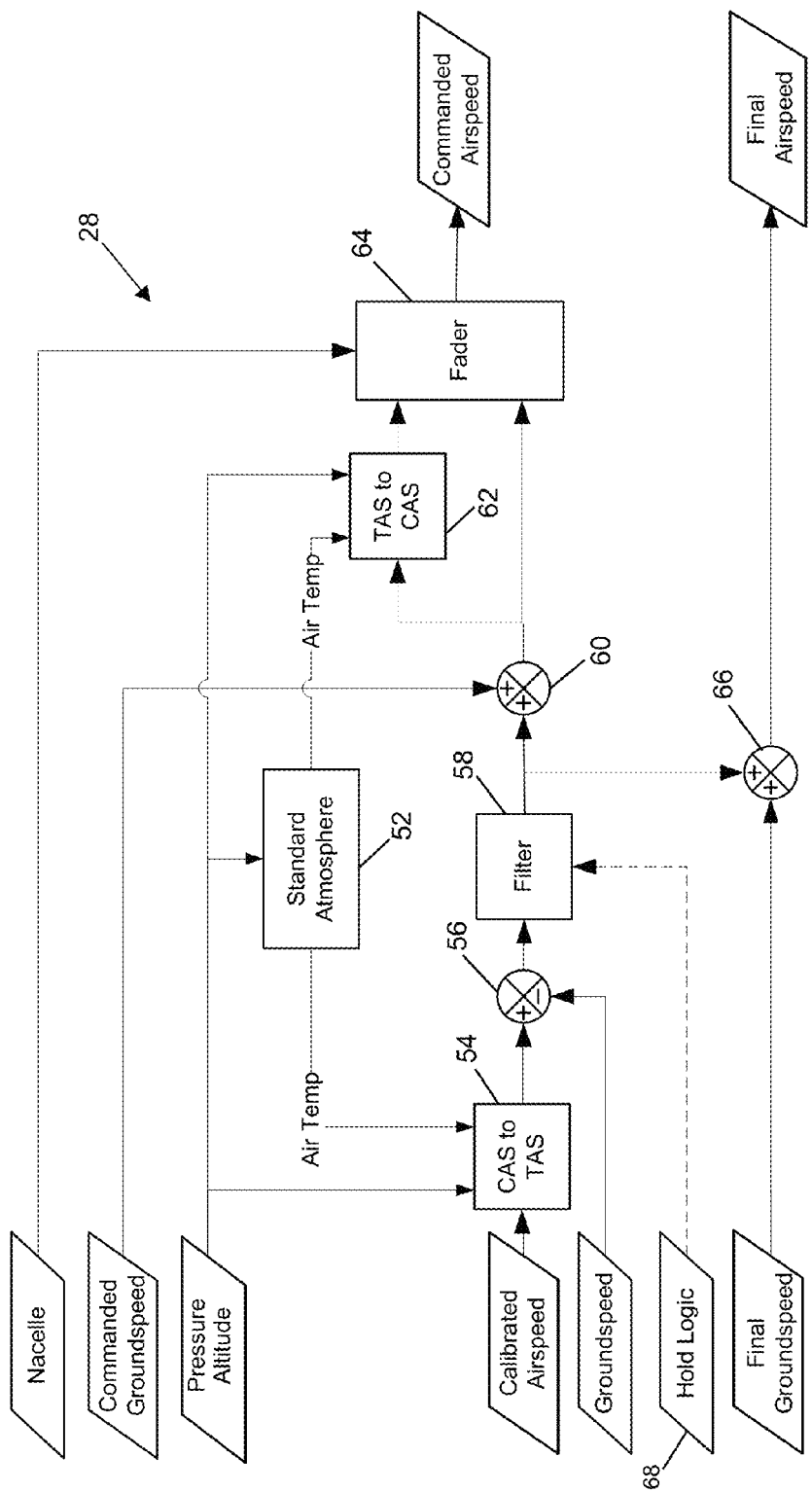
FIG. 5A is a flowchart showing control logic for converting a groundspeed command to an airspeed command in accordance with one embodiment.

FIG. 5A is a flowchart showing control logic for converting a groundspeed command to an airspeed command in accordance with one embodiment of the avionics mission computer. (Data inputs and outputs are indicated in FIG. 5A by labeled parallelograms.) The groundspeed to airspeed command conversion function 28 takes in the current commanded groundspeed and final groundspeed and outputs the current commanded airspeed and final airspeed through the multi-step process depicted in FIG. 5A.

The process starts by computing a pseudo true airspeed (TAS) using calibrated airspeed (CAS), pressure altitude, and the ambient air temperature, which can be computed from a standard atmosphere profile 52 (as shown in FIG. 5A) or measured using a temperature sensor. The computation of pseudo TAS is indicated by operation 54 in FIG. 5A. The groundspeed is then subtracted from the pseudo true airspeed (operation 56) to obtain the component of the wind velocity vector along the flight path. This wind speed is filtered by filter 58, and the filtered wind speed is frozen by hold logic 68 if air data is unreliable, such as when the aircraft is flying at low airspeed.

The filtered wind speed is used in two ways. It is first added to the final groundspeed (operation 66 in FIG. 5A) to obtain the final true airspeed. True airspeed and nacelle angle are primary drivers of aircraft trim attitude in the near hover flight regime. Therefore the estimate of final true airspeed is appropriate to use to set the final nacelle position to obtain a suitable final hover pitch attitude.

The filtered wind speed is also added to the current commanded groundspeed (operation 60 in FIG. 5A) to obtain the current commanded true airspeed. Current commanded true airspeed is converted to a commanded calibrated airspeed (operation 62) using pressure altitude and the ambient air temperature from a sensor or from the standard atmosphere profile 52. The commanded airspeed provided to the flight control system is a blend of the true and calibrated airspeed commands. In airplane mode flight, with lift provided by the wings, calibrated airspeed (dynamic pressure) is a prime driver of aircraft pitch for a given aircraft loading and vertical velocity. Therefore, the blended commanded airspeed is equivalent to the commanded calibrated airspeed when the nacelles are on the downstops (i.e., nacelle angle=0 deg). As the aircraft transitions through conversion mode to helicopter mode, the blended commanded airspeed fades to the commanded true airspeed. More specifically, the fader 64 applies a weighted average of the two inputs, favoring one input transitioning to the other as a function of the nacelle angle.

As previously mentioned in the discussion of the final airspeed, true airspeed governs aircraft trim in helicopter flight. Additionally the upper conversion corridor is a function of rotor tip Mach number. Therefore fading to true airspeed to manage the nacelle angle versus calibrated airspeed allows the system to smoothly and proactively manage margins from the upper conversion corridor. The blended commanded airspeed fully reflects the commanded true airspeed at a nacelle angle of 60 deg, as that is when the upper conversion corridor becomes the most restrictive.

Due to the use of the ambient air temperature from the standard atmospheric profile 52 as opposed to measured ambient air temperature, the wind speed contains an error that is a function of aircraft speed and the difference between actual ambient air temperature and the standard day ambient air temperature. As the same temperature assumption is made to convert commanded true airspeed to commanded calibrated airspeed, this error is cancelled so that the commanded calibrated airspeed reflects actual aircraft calibrated airspeed as long as airspeed is not changing rapidly. If the aircraft is decelerating, the magnitude of the wind speed error decreases as the speed decreases, such that by the time the aircraft achieves the final airspeed, the error is sufficiently minimized.

Figure 5B:
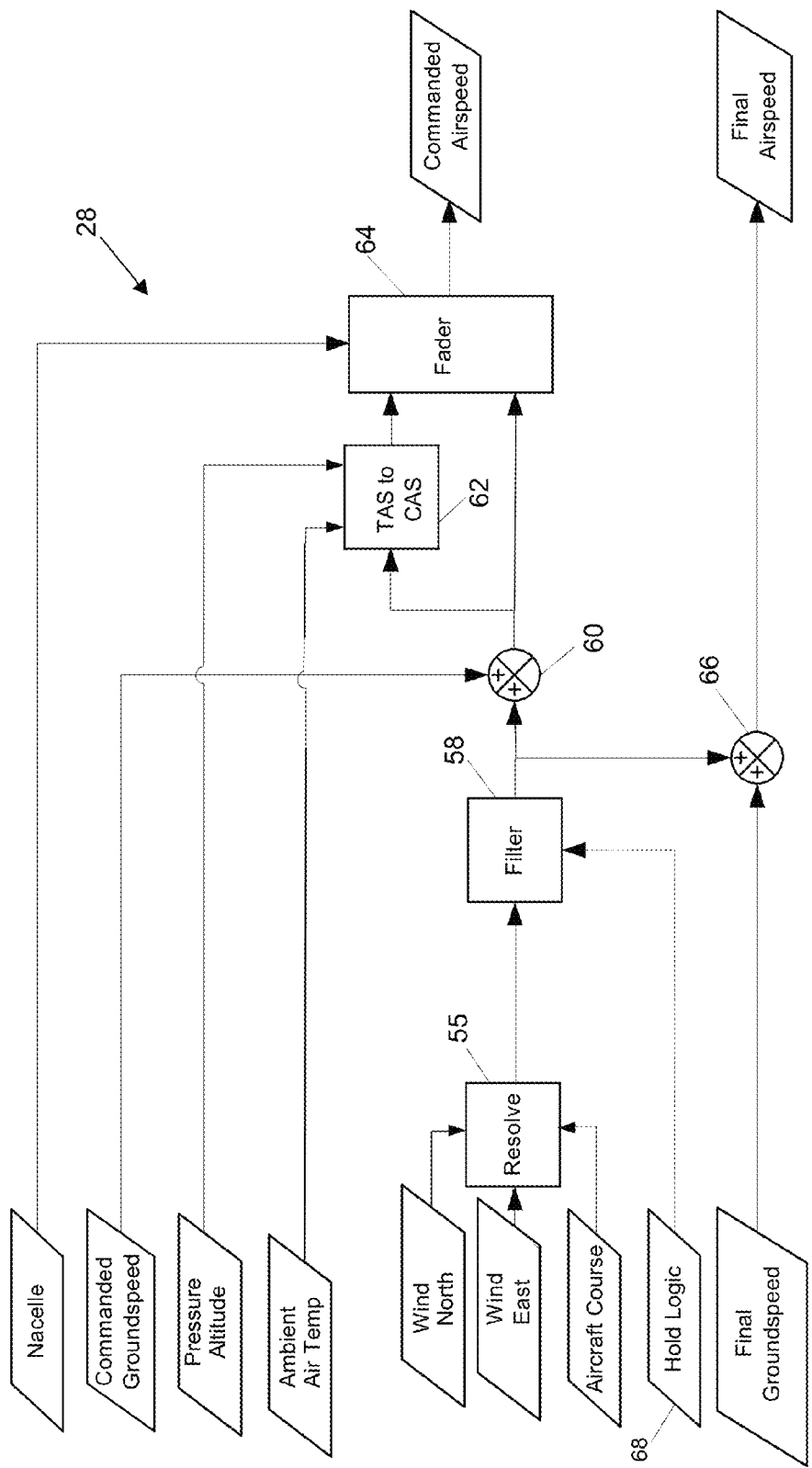
FIG. 5B is a flowchart showing control logic for converting a groundspeed command to an airspeed command in accordance with another embodiment.

FIG. 5B is a flowchart showing control logic for converting a groundspeed command to an airspeed command in accordance with another embodiment. The groundspeed to airspeed command conversion function 28 takes in the current commanded groundspeed and final groundspeed and outputs the current commanded airspeed and final airspeed through the multi-step process depicted in FIG. 5B. This process differs from the process shown in FIG. 5A in that the component of the wind velocity vector along the flight path is obtained by resolving the north and east wind components and the aircraft course, instead of computing a pseudo true airspeed and then subtracting the groundspeed from the pseudo true airspeed. This wind speed is filtered by filter 58, and the filtered wind speed is frozen by hold logic 68 if air data is unreliable, such as when the aircraft is flying at low airspeed. The filtered wind speed is then used in the same ways as previously described with reference to FIG. 5A.

System Interface Between Mission Computer and Flight Control System

FIG. 6 shows an advanced mission computer (AMC) 20 to flight control system (FCS) 30 interface in accordance with one embodiment. On V-22 aircraft, guidance profiles, mode states, and deviations from the profiles are computed by the AMC 20 and relayed to the FCS 30 for loop closure.

Since functions are split between two systems on the V-22 aircraft, handshaking needs to be performed to ensure the health of the systems and that they agree on what is being done with the aircraft. The AMC 20 computes the desired path for the aircraft to take, and the FCS 30 controls the aircraft to follow that path. The handshake consists of three parts. The FCS 30 indicates if the necessary control paths are AVAIL- ABLE for use to the AMC 20. If the paths are available, and are selected by the pilot, the AMC 20 sends and ACCEPT command to the FCS 30. Once given the accept command, the FCS 30 reports ENGAGED back to the AMC 20 to indicate successful engagement of the necessary control paths. The respective signals shown in FIG. 6 are the following:

Autonacelle Control Available: Logic indicating that the system failure states allow automatic positioning of nacelles.

Autonacelle Angle Available: Logic indicating that the system can successfully compute nacelle commands for display to the pilot.

Autonacelle Control Accept: Logic indicating that the pilot has selected for the system to automatically position nacelles.

Autonacelle Angle Accept: Logic indicating that the pilot has engaged a guidance mode that utilizes the nacelle angle display.

FD DHOV/GA Accept: Logic indicating that the pilot has engaged a "Depart from Hover/Go Around" function of the system. Nacelle commands are specially tailored to this type of maneuver.

Autonacelle Control Engaged: Logic indicating that the FCS 30 has engaged the control paths to automatically position nacelles.

Autonacelle Angle Engaged: Logic indicating that the FCS 30 is computing nacelle angle commands for display.

FD DHOV/GA Engaged: Logic indicating that the tailored nacelle commands for DHOV/GA are being used.

Pilot on Thumbwheel: Logic indicating that the pilot has attempted to manually move nacelles and that automatic nacelle control should be deactivated.

Desired Speed: Current instantaneous airspeed command computed by AMC 20 as the aircraft transitions speed. (This parameter is the same as "Commanded Airspeed" in FIGS. 5 and 8.)

Desired Final Speed: Target airspeed at end of maneuver computed by AMC 20. (This parameter is the same as "Final Airspeed" in FIGS. 5 and 8.)

Desired Nacelle Position: Instantaneous nacelle position (computed by FCS 30) to satisfy the desired speed.

Final Nacelle Position: Final nacelle position at the end of the maneuver (computed by FCS 30) to satisfy the desired final speed.

In order for the enhanced AUTO NAC function to adaptively manage the nacelles, the FCS 30 uses additional guidance data to manage nacelles as shown in FIG. 6. The active guidance mode has been updated to output the inertial deceleration rate (i.e., "Desired Acceleration" in FIG. 6; "Commanded Deceleration" in FIGS. 4 and 8) to the FCS 30. At the present time the primary use of the enhanced AUTO NAC function is to perform approaches to hover; therefore a discrete signal (i.e., bit) is transmitted to the FCS 30 (i.e., "Tactical APPR Nacelle Accept" in FIG. 6) to prompt use of the enhanced function. The rate of climb error (i.e., "Rate of Climb Error" in FIG. 6) and the bit to use rate of climb error in altitude axis loop closure (i.e., "Altitude Error Accept" in FIG. 6) already existed in the interface but were not previously used by the AUTO NAC function.

Inertial Descent Rate Command Computation

Depending on the mission scenario, a speed change can be accomplished with or without a guidance mode active in the altitude axis. If a guidance mode is active in the altitude axis, the system could be commanding a climb, descent, or level flight. Guidance based on commands from a terrain following radar could also be used. If coupled, rate of climb error is provided to the FCS 30 and can be used by the inertial descent rate command computation 36 (see FIG. 4) to infer the inertial descent rate commanded by the active guidance mode 24. When uncoupled, or using terrain following, rate of climb error is not provided to the FCS 30. If it were provided to the FCS 30, it would not be reliable as the pilot may not necessarily be tightly following the flight director cueing to cause the actual inertial velocity to match the commanded vertical velocity. In order to manage pitch attitude with small adjustments to nacelle position, the inertial descent rate used by the AUTO NAC function should closely match actual aircraft inertial vertical velocity, but with appropriate filtering to provide a stable signal in turbulence and maneuvers. This is accomplished with the algorithm presented in FIG. 7.

When uncoupled in the altitude axis, logic switches 72 and 74 are in respective False states, whereby the inertial vertical velocity (i.e., "Inertial Rate of Climb" in FIG. 7) is simply filtered using a lag filter 78 having a long time constant (e.g., time constant $\tau=5.0$ sec). The long time constant is required to prevent turbulence from degrading the nacelle commands; however, it comes at the expense of delayed response to deliberate pilot changes in aircraft vertical velocity.

When the altitude axis is coupled, logic switches 72 and 74 are in respective True states, whereby the rate of climb error is combined by summer 70 with locally sensed inertial vertical velocity to obtain the guidance commanded inertial vertical velocity. This is lightly filtered by lag filter 78 (e.g., time constant $\tau=0.5$ sec) to remove the effects of sampling and timing differences between the mission computer 20 and flight control system 30 with respect to the inertial vertical velocity signal. Heavy filtering is not required when the altitude axis is coupled as the dynamic effect of turbulence on inertial vertical velocity and rate of climb error is equal and opposite; therefore it is cancelled when the two signals are combined.

In both cases, commanded vertical velocity is limited (operation 80 in FIG. 7) to a range consistent with typical guidance profiles to prevent large velocities from substantially affecting nacelle position in a way that could affect maneuverability or place the aircraft close to stall if the pilot were to rapidly recover the aircraft to level flight. The resulting inertial descent rate command ("Inertial Descent Rate" in FIG. 7) is used by the AUTO NAC function to determine the current and final nacelle angle commands (as described in more detail below with reference to FIG. 8).

Finally if the sensed vertical velocity in the flight control system is declared failed (i.e., the logic switch 76 is in a True state), its contribution to the nacelle commands is removed by setting the commanded vertical velocity to zero.

Nacelle Angle Command Computation

Figure 8:
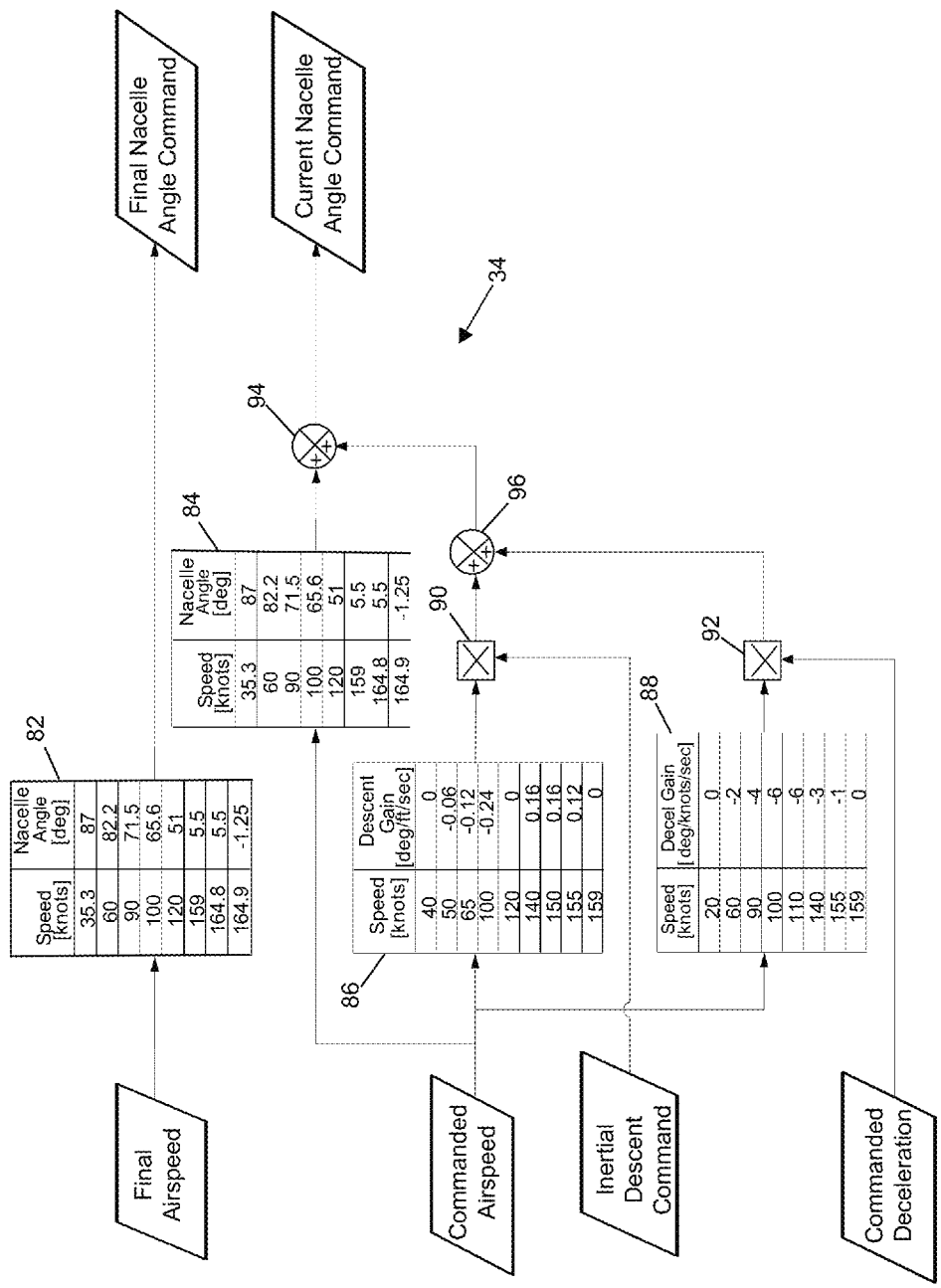
FIG. 8 is a flowchart showing control logic for computing current and final nacelle angle commands in accordance with one embodiment.

With the speed commands, deceleration command and descent command available, the current and final nacelle angle commands may be computed as shown in FIG. 8. The current nacelle angle command is comprised of three parts, the first of which is solely based upon the current commanded airspeed, which is input to a first airspeed versus nacelle angle schedule 84. This component reflects the nacelle angle required for a favorable pitch attitude at a given speed in un-accelerated level flight. Schedule 82 is applied to the final airspeed to obtain the final nacelle command. Since schedule 84 reflects flight consistent with the final stable condition, schedule 82 and 84 are the same.

The second part of the current nacelle command contains the adjustment for inertial descent rate. The effect of inertial descent rate on aircraft pitch attitude is a function of aircraft configuration and speed. Near airplane mode (high speed) trimmed descent requires a reduction in pitch attitude, which can be counteracted by delaying the tilting of the thrust vector. Therefore, the current nacelle command is biased down if the aircraft is in a descent at high speed. As the aircraft transitions through the conversion mode, this trend reverses, resulting in an increase in pitch attitude as descent rate increases. This is countered by moving the nacelles more aft in descending flight. Near hover in helicopter mode, the coupling between descent rate and pitch attitude is less straightforward. Additionally, there exists significant coupling between longitudinal trim and nacelle motion that impedes aggressive use of nacelles by the AUTO NAC function. For both reasons, the current nacelle command is not affected by the descent rate command when near hover.

The final part of the current nacelle command uses the deceleration rate command. Near airplane mode, decelerations are accomplished via a reduction in power with no nacelle movement. Operation near helicopter mode flight, however, requires rearward tilt of the rotor and thrust vector to accomplish deceleration. The unique feature of a tilt rotor is that the rearward tilt can be accomplished through pitch attitude, nacelle movement, or a combination thereof. Since the objective of the AUTO NAC function is to stabilize the pitch attitude, the required rearward tilt necessary for deceleration is accomplished by biasing the nacelles aft. This contribution is phased in as the aircraft slows down, peaking in the conversion mode. The aerodynamic relationship between the nacelle position, pitch attitude, and deceleration rate remains, however, due to the coupling described earlier, which limited the use of descent rate at low airspeed in the AUTO NAC function, the contribution of deceleration rate to the current nacelle command is also neglected at low airspeed.

The schedules 86 and 88 that respectively determine the descent rate contribution and deceleration rate contribution use the commanded airspeed as opposed to the current nacelle angle to avoid creating a feedback loop of current aircraft airspeed or nacelle angle into the nacelle command. The descent gain output from schedule 86 is multiplied by the inertial descent command in multiplier 90; the deceleration gain output from schedule 88 is multiplied by the commanded deceleration in multiplier 92; and these products are then added in summer 96 to form an adjustment angle. This adjustment angle is added to the nacelle angle output from schedule 84 in summer 94 to give the current nacelle angle command.

The technical features disclosed above provide an enhanced automatic nacelle conversion capability through the use of additional guidance and atmospheric data. A known ratio method for converting groundspeed commands to calibrated airspeed commands has been replaced by a method that separately calculates and accounts for the effects of wind and altitude on the aircraft trim characteristics and structural load limits. The improved automatic nacelle conversion function has the capability to switch to an alternate method of computing the nacelle angle commands for ground reference maneuvers such as an approach to landing. This method of computing the nacelle angle commands comprises computing a trimmed level flight command, and then modifying that command based on the current deceleration rate command and inertial descent rate command. The inertial descent rate command is computed differently based upon if a vertical guidance mode is active and if the system is flight directed (the pilot is managing flight path while the AUTO NAC function manages aircraft configuration) or coupled (the aircraft manages both flight path and aircraft configuration).

The method of converting groundspeed commands to airspeed commands computes a pseudo-true airspeed that assists in the computation of the wind along the approach course. This is used in two ways: the first is in the computation of the current true airspeed command and current calibrated airspeed command. These two commands form a blended airspeed command that is weighted by the aircraft configuration via the nacelle angle. The blending is done in a manner that favors calibrated airspeed in airplane mode flight and true airspeed in helicopter mode flight. Use of calibrated airspeed in airplane mode avoids stalling, and use of true airspeed in helicopter mode accounts for performance characteristics as well as proactively accounting for structural load limits imposed by the upper conversion corridor limit, which is a function of Mach number.

Once the alternate method of nacelle computation has been engaged, the AUTO NAC function is able to adapt to a multitude of mission profiles with various combinations of decelerations/accelerations and rates of descent. By separating the individual flight parameters that contribute to aircraft trim, the individual effect of each of those parameters, and how they change with aircraft configuration, can be counteracted by the AUTO NAC function to provide a stable aircraft attitude as the aircraft transitions between helicopter and airplane mode flight. This supports both high and low altitude penetrations as well as terrain following flight.

The improvements disclosed above provide a stable platform as the aircraft transitions between helicopter flight and airplane flight that is robust to winds, altitude and flight profile. A stable platform allows for crew and troops to prepare for immediate egress upon landing for military applications, and provides for passenger comfort in civilian applications.

While systems and methods for automatically controlling nacelle movement during operation of a tilt rotor aircraft have been described with reference to a preferred embodiment, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiment.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit. For example, a computer system may comprise a mission computer and one or more flight control computers.

In addition, the method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

As used in the claims, "ambient air temperature" may be either sensed or read from a pre-stored atmospheric profile.

The invention claimed is:

1. A method for controlling a nacelle angle of a tilt rotor assembly of a tilt rotor aircraft, comprising the following operations:

converting a commanded groundspeed into a commanded airspeed by taking into account a pressure altitude of a tilt rotor aircraft and ambient air temperature;

inputting said commanded airspeed to a speed versus nacelle angle schedule to obtain a nacelle angle that produces a favorable pitch attitude at a given airspeed in un-accelerated level flight of the tilt rotor aircraft;

receiving or locally inferring, if not available, an inertial descent rate command from a flight management system or pre-planned maneuver for commanding an inertial descent rate of the tilt rotor aircraft;

computing an adjusted nacelle angle command as a function of said inertial descent rate command; and controlling a conversion actuator of the tilt rotor aircraft in accordance with said adjusted nacelle angle command.

2. The method as recited in claim 1, wherein said adjusted nacelle angle command is also a function of a deceleration rate command.

3. The method as recited in claim 2, wherein said computing an adjusted nacelle angle command comprises:
inputting said commanded airspeed to a speed versus descent gain schedule which outputs a descent gain;
forming a first product by multiplying said descent gain and said inertial descent rate command;
inputting said commanded airspeed to a speed versus deceleration gain schedule which outputs a deceleration gain;
forming a second product by multiplying said deceleration gain and said deceleration rate command;
summing said first and second products to form an adjustment angle; and
summing said nacelle angle and said adjustment angle.

4. The method as recited in claim 1, wherein said operation of converting a commanded groundspeed into a commanded airspeed comprises:
computing a component of wind velocity along a flight path of the tilt rotor aircraft;
filtering said component of wind velocity; and
summing said filtered component of wind velocity and said commanded groundspeed to form a commanded true airspeed.

5. The method as recited in claim 4, wherein said operation of converting a commanded groundspeed into a commanded airspeed further comprises:
computing a commanded calibrated airspeed using said commanded true airspeed, said pressure altitude, and said associated ambient air temperature; and
computing a commanded airspeed through a weighted average of said commanded true airspeed and said commanded calibrated airspeed using weighting factors which are a function of a nacelle angle.

6. The method as recited in claim 1, wherein said operation of locally inferring an inertial descent rate command comprises:
summing an inertial rate of climb and a rate of climb error to obtain a commanded inertial vertical velocity;
filtering said commanded inertial vertical velocity; and
limiting said filtered commanded inertial vertical velocity to a range.

7. The method as recited in claim 1, further comprising displaying said nacelle angle command on a cockpit display for a pilot.

8. A system for generating a nacelle angle command onboard a tilt rotor aircraft, comprising a conversion actuator, a tiltable nacelle, and a computer system programmed to perform the following operations:
converting a commanded groundspeed into a commanded airspeed by taking into account a pressure altitude of the tilt rotor aircraft and ambient air temperature;
inputting said commanded airspeed to a speed versus nacelle angle schedule to obtain a nacelle angle that produces a favorable pitch attitude at a given airspeed in un-accelerated level flight of the tilt rotor aircraft;

receiving or locally inferring, if not available, an inertial descent rate command from a flight management system or pre-planned maneuver for commanding an inertial descent rate of the tilt rotor aircraft;

computing an adjusted nacelle angle command as a function of at least said inertial descent rate command; and controlling said conversion actuator to tilt said nacelle in accordance with said adjusted nacelle angle command.

9. The system as recited in claim 8, wherein said adjusted nacelle angle command is also a function of a deceleration rate command.

10. The system as recited in claim 9, wherein said operation of computing an adjusted nacelle angle command comprises:
inputting said commanded airspeed to a speed versus descent gain schedule which outputs a descent gain;
forming a first product by multiplying said descent gain and said inertial descent rate command;
inputting said commanded airspeed to a speed versus deceleration gain schedule which outputs a deceleration gain;
forming a second product by multiplying said deceleration gain and said deceleration rate command;
summing said first and second products to form an adjustment angle; and
summing said nacelle angle and said adjustment angle.

11. The system as recited in claim 8, wherein said operation of converting a commanded groundspeed into a commanded airspeed comprises:
computing a component of wind velocity along a flight path of the tilt rotor aircraft;
filtering said component of wind velocity; and
summing said filtered component of wind velocity and said commanded groundspeed to form a commanded true airspeed.

12. The system as recited in claim 11, wherein said operation of converting a commanded groundspeed into a commanded airspeed further comprises:
computing a commanded calibrated airspeed using said commanded true airspeed, said pressure altitude, and said associated ambient air temperature; and
computing a commanded airspeed through a weighted average of said commanded true airspeed and said commanded calibrated airspeed using weighting factors which are a function of a nacelle angle.

13. The system as recited in claim 8, wherein said operation of locally inferring an inertial descent rate command comprises:
summing an inertial rate of climb and a rate of climb error to obtain a commanded inertial vertical velocity;
filtering said commanded inertial vertical velocity; and
limiting said filtered commanded inertial vertical velocity to a range.

14. The system as recited in claim 8, further comprising a cockpit display for a pilot, wherein said computer system is further programmed to display said nacelle angle command on said cockpit display.

15. A tilt rotor aircraft comprising: a fuselage; at least one wing member coupled to the fuselage; a tilt rotor assembly pivotally coupled to the at least one wing member for tilting over a range of nacelle angles; a nacelle conversion actuator for actuating pivoting of said tilt rotor assembly; and a computer system programmed to perform the following operations:
converting a commanded groundspeed into a commanded airspeed by taking into account a pressure altitude of the tilt rotor aircraft and ambient air temperature;

inputting said commanded airspeed to a speed versus nacelle angle schedule to obtain a nacelle angle that produces a favorable pitch attitude at a given airspeed in un-accelerated level flight of the tilt rotor aircraft;

computing an inertial descent rate command for commanding an inertial descent rate of the tilt rotor aircraft;

computing an adjusted nacelle angle command as a function of said inertial descent rate command and a deceleration rate command; and controlling said conversion actuator to tilt said tilt rotor assembly in accordance with said adjusted nacelle angle command.

16. The tilt rotor aircraft as recited in claim 15, wherein said operation of computing an adjusted nacelle angle command comprises:

inputting said commanded airspeed to a speed versus descent gain schedule which outputs a descent gain;

forming a first product by multiplying said descent gain and said inertial descent rate command;

inputting said commanded airspeed to a speed versus deceleration gain schedule which outputs a deceleration gain;

forming a second product by multiplying said deceleration gain and said deceleration rate command;

summing said first and second products to form an adjustment angle; and summing said nacelle angle and said adjustment angle.

* * * * *